3,262,934
AMINO-SUBSTITUTED XANTHENES AND
THIOXANTHENES
John W. Cusic, Skokie, and Peter Yonan, Chicago, Ill.,
assignors to G. D. Searle & Co., Chicago, Ill., a corporation of Delaware
No Drawing. Filed Oct. 21, 1964, Ser. No. 405,616
12 Claims. (Cl. 260—268)

The present application is a continuation-in-part of application Serial No. 293,137, filed July 5, 1963, and now abandoned; application Serial No. 293,141, filed July 5, 1963, now U.S. patent 3,159,636; application Serial No. 333,686, filed December 26, 1963, now U.S. patent 3,157,658; application Serial No. 361,538, filed April 21, 1964; and application Serial No. 368,366, filed May 18, 1964.

The present invention relates to a method for the preparation of xanthenes and thioxanthenes having a secondary amino substituent at the 9-position and to compounds prepared by such a process. The type of structure involved can be illustrated by the following formula

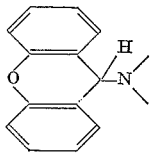

where the free valences on the nitrogen are attached to alkyl groups rather than directly to a functional group. Tertiary amines of such a type are ordinarily prepared by the reaction of a secondary amine with an appropriate halide which, in the present case, would mean the use of 9-chloroxanthene or a similar compound. But, haloxanthenes of this type are very reactive and decompose readily so that they are difficult to synthesize, store, and use, and, as a result, use of such a material does not provide a satisfactory method for preparing compounds of the type referred to above. Evidence of the unsatisfactory nature of such a procedeure is provided by the fact that practically no compounds of the type illustrated above are described in the literature as having been prepared by this or any other procedure.

In contrast, applicants have found that readily available compounds such as xanthydrol and thioxanhydrol react with secondary amines to give 9-aminoxanthenes. Such a procedure gives the indicated products conveniently and in good yield and is particularly attractive because of the availability and relative stability of the starting materials involved. The present process thus provides a convenient method for preparing a great many compounds which have heretofore been unknown.

More generally then, the present invention relates to the preparation of compounds of the following structure

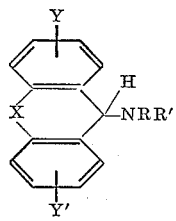

wherein X or O or S; and Y and Y' are inert substituents such as hydrogen, halogen (fluorine, chlorine, bromine, and iodine), lower alkyl containing up to 6 carbon atoms (e.g methyl, ethyl, propyl and the like), and lower alkoxy containing up to 6 carbon atoms (e.g. methoxy, ethoxy, propoxy and the like). The groups Y and Y' can be the same or different in the same molecule.

The groups R and R' are selected in such a manner that HNRR' would be a secondary amine. That is, in the substituents, the carbon attached to the nitrogen is preferably a methylene group although it can be any carbon whose additional free valences are satisfied only by attachment to carbon or hydrogen. Thus, —NRR' can be an open-chain group such as dimethylamino, diethylamino, and dipropylamino. The groups R and R' can be combined so that —NRR' would be a cyclic amino group such as 1-pyrrolidinyl, piperidino, hexamethyleneimino, piperazinyl, homopiperazinyl, and morpholino. These cyclic substituents can be further substituted with inert groups such as one or more methyl groups, phenyl groups, or benzyl groups. These phenyl and benzyl groups can further have, as substituents, groups such as methyl, halogen, and methoxy. The cyclic amines can also have functional groups as substituents. Among such functional groups substituents are nitroso, carbalkoxy, carbamoyl, N-alkylcarbamoyl, N,N-dialkylcarbamoyl, (cyclic amino)carbonyl, N-dialkylaminoalkylcarbamoyl, and N-(cyclic amino)alkylcarbamoyl. In these functional group substituents, the alkyl or alkoxy portion are lower alkyl or lower alkoxy containing up to 6 carbon atoms. Thus, carbalkoxy can be illustrated by carbomethoxy, carbethoxy, and the like; N-alkylcarbamoyl can be illustrated by N-methylcarbamoyl, N-ethylcarbamoyl, and the like; N,N-dialkylcarbamoyl can be illustrated by N,N-dimethylcarbamoyl, N,N-diethylcarbamoyl, and the like; (cyclic amino)carbonyl can be illustrated by piperidino-carbonyl, morpholinocarbonyl, 4-methyl-1-piperazinyl-carbonyl and the like; N-dialkylaminoalkylcarbamoyl can be illustrated by N-(2-dimethylaminoethyl)carbamoyl, N - (2-diethylaminoethyl)carbamoyl, N - (3-diethylaminopropyl)carbamoyl, and the like. In those radicals based on cyclic amines, the amine can be 1-pyrrolidinyl, piperidinyl, hexamethyleneimino, morpholino, and 4-(lower alkyl)-1-piperazinyl. Some examples of N-(cyclic amino)alkylcarbamoyl radicals would then be N-(2-piperidinoethyl)-carbamoyl, N-(3-piperidinopropyl)carbamoyl, N-(2-morpholinoethyl)carbamoyl, and N-[2-(4-methyl - 1-piperazinyl)ethyl]carbamoyl. Obviously, various combinations of the substituents listed above can be used in the amine portion of the compounds involved. Thus, —NRR' can represent groups such as 4-carbethoxy-4-phenylpiperidino and 4-carbethoxy-4-(4-chlorophenyl)-piperidino and similar complex substituted amino groups.

In addition, when —NRR' is a cyclic amine, it can have a functional group, such as a carbonyl group, as part of the cyclic structure. One example of an amine of this type is piperazinone.

The products resulting from the process of the present invention either possess useful pharmacological activity themselves or can be used as intermediates for the preparation of compounds having such useful activity. Thus, compounds such as 1-(9-xanthenyl)-4-carbethoxypiperazine are potent anti-ulcer agents; compounds such as ethyl 1-(9-xanthenyl)piperidine-4-carboxylate are potent anti-ulcer agents, pepsin inhibitors, and anti-atherogenic agents. Other esters such as ethyl 1-(9-xanthenyl)-4-phenylpiperidine-4-carboxylate possess anti-atherogenic activity and hypotensive activity. Amides such as 1-(9-xanthenyl)-4-carbamoylpiperidine and 1-(9-xanthenyl)-4-(N-diethylaminoethylcarbamoyl)piperidine possess some anti-ulcer activity and also possess activity against a number of microorganisms. Thus, they inhibit the growth of the protozoa *Tetrahymena gelleii* and of the alga *Chlorella vulgaris*. 1-(9-xanthenyl)-4-methylpiperazine and similarly substituted piperazines possess activity as anti-ulcer agents, anti-bacterial agents against the organism *Diplococcus pneumoniae*, and anti-algal agents against the organism *Chlorella vulgaris*.

Other compounds such as 1-(9-xanthenyl)-4-nitrosopiperazine can be reduced with lithium aluminum hydride to give 1-(9-xanthenyl)-4-aminopiperazine which itself possesses good anti-ulcer activity or which can be reacted with a variety of aldehydes or ketones to give the corresponding hydrazones, a group of potent anti-ulcer agents. Examples of such hydrazones are 1-benzylideneamino-4-(9-xanthenyl)piperazine and 1-(4-pyridylmethyleneamino)-4-(9-xanthenyl)piperazine.

The process of the present invention is carried out by reacting an appropriate secondary amine with a compound of the formula

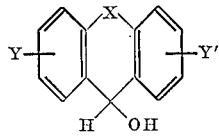

wherein X, Y, and Y' are defined as above. The reaction is carried out by bringing the reactants together in contact in an inert solvent in the presence of an acid catalyst. Ordinarily, the reaction is carried out using chemically equivalent quantities of the xanthydrol compound, the secondary amine, and the acid catalyst, although use of these precise proportions is not necessary in order to obtain the desired product from the reaction.

The acids which can be used to catalyze the reaction are organic carboxylic acids. Low molecular weight carboxylic acids are preferred, but this is only because of their economy and ease of manipulation. Thus, acetic acid is a particularly preferred acid for use in this reaction although other alkanoic acids such as propionic and butyric acids can also be used. In addition, aromatic carboxylic acids such as benzoic acid and substituted benzoic acids can be used in the reaction.

The solvent used should be an inert organic solvent which will not react with the components of the reaction mixture under the conditions used for carrying out the reaction. Ideally, the starting material should be soluble and the product insoluble in the solvent, although this is not a necessity since, if the product is soluble, the solvent can be evaporated from the mixture to permit isolation of the product. Examples of various useful solvents are hydrocarbons such as benzene and toluene and alcohols such as ethanol and 2-propanol.

The exact method for handling the reactants and the reaction mixture can obviously be varied without departing from the novel concept of the present process. Thus, when aromatic hydrocarbons such as benzene or toluene are used as solvents for carrying out a reaction, it is useful to reflux the reaction mixture in an apparatus equipped with a water trap so that water can be separated from the reaction mixture as it is formed. The mixture is generally heated at reflux until approximately the calculated theoretical amount of water has separated from the reaction mixture. Obviously though, the process still takes place even if the heating time is varied from that suggested above.

On the other hand, when the reaction mixture is carried out in an alcohol such as ethanol, no provision is necessary for removing water from the reaction mixture as it is formed. In fact, depending on the particular starting materials used, the reactants can be allowed to stand in the solution at room temperature and the product will precipitate from the mixture. However, insolubility of the final product is merely a convenience and not a necessity, since, to isolate the product, the solvent can simply be evaporated from the reaction mixture to leave a residual material which is the desired product in crude form.

In addition, where relatively high boiling or water insoluble acids are used as catalysts, an alkaline wash of the reaction mixture or of a solution of the crude product can be useful to simplify the removal of acid catalyst in the purification of the product. Thus, it should be obvious that various modifications in the experimental procedure are possible without departing from the inventive concept of the present invention since such modifications are obviously within the capacities of one skilled in the art.

The following examples are presented to further illustrate the present invention. They should not be construed as limiting it in spirit or in scope. Likewise, various groups and substituents used as illustrations should not be construed as limitations on the present invention. In the following examples, quantities are given in parts by weight and temperatures in degrees centigrade (° C.).

*Example 1*

A mixture of 20 parts of xanthydrol, 12 parts of 1-nitrosopiperazine, and 6 parts of glacial acetic acid in 110 parts of toluene is refluxed for 16 hours in an apparatus equipped with a water trap. The reaction mixture is cooled and the solvent is evaporated to leave a crystalline residue. This residue is crystallized from a mixture of benzene and hexane to give 1-nitroso-4-(9-xanthenyl)-piperazine melting at about 182–183° C.

If an equivalent quantity of thioxanthydrol is substituted for the xanthydrol and the above procedure is repeated, the product obtained is 1-nitroso-4-(9-thioxanthenyl)piperazine melting at about 158–163° C. after recrystallization from a mixture of benzene and hexane.

Similarly, if 2-chloroxanthydrol is reacted with 1-nitrosopiperazine in the manner described above, the product obtained is 1-nitroso-4-(2-chloro-9-xanthenyl)piperazine. Likewise, 4-methylxanthydrol reacts with 1-nitrosopiperazine to give 1-nitroso-4-(4-methyl-9-xanthenyl)piperazine.

*Example 2*

A solution of 50 parts of xanthydrol and 40 parts of 1-carbethoxypiperazine in 305 parts of toluene and 16 parts of glacial acetic acid is refluxed for 18 hours in an apparatus equipped with a water trap. The hot mixture is then treated with charcoal and filtered and the solvent is evaporated from the filtrate under reduced pressure. The residue is recrystallized first from hexane and then from a mixture of benzene and hexane to give 1-carbethoxy-4-(9-xanthenyl)piperazine melting at about 145–146°.

If an equivalent quantity of 1-carbomethoxypiperazine is substituted for the 1-carbethoxypiperazine and the procedure of Example 1 is repeated, the product is 1-carbomethoxy-4-(9-xanthenyl)piperazine.

*Example 3*

A mixture of 10 parts of 2-chloroxanthydrol, 7 parts of 1-carbethoxypiperazine, 150 parts of toluene, and 5 parts of glacial acetic acid is refluxed for 16 hours in an apparatus equipped with a water trap. The hot mixture is treated with charcoal and filtered and the solvent is evaporated from the filtrate. The residue thus obtained is crystallized first from hexane and then from 2-propanol to give 1-carbethoxy-4-(2-chloro-9-xanthenyl)piperazine melting at about 128–129° C.

*Example 4*

A mixture of 11 parts of thioxanthydrol, 9 parts of 1- carbethoxypiperazine, 150 parts of toluene and 4 parts of glacial acetic acid is refluxed for 16 hours. The solvent is evaporated from the hot reaction mixture under reduced pressure to leave a residual solid which is then recrystallized from a mixture of benzene and hexane. The product thus obtained is 1-carbethoxy-4-(9-thioxanthenyl)piperazine melting at about 135–136° C.

If an equivalent quantity of 1-carbomethoxypiperazine is substituted for the 1-carbethoxypiperazine in the above procedure, the product is 1-carbomethoxy-4-(9-thioxanthenyl)piperazine.

Example 5

To a solution of 15 parts of xanthydrol and 12 parts of methyl piperidine-4-carboxylate in 155 parts of toluene is added 8 parts of glacial acetic acid. The resultant mixture is refluxed for 16 hours in an apparatus equipped with a water trap. The solvent is evaporated from the resultant solution at reduced pressure and the residue is dissolved in ether. The ether solution is then washed with water and dried and the solvent is evaporated to give an oil which solidifies when triturated with hexane. The resultant solid is then recrystallized from hexane to give methyl 1-(9-xanthenyl)piperidine-4-carboxylate melting at about 91–92° C.

Example 6

A mixture of 24 parts of xanthydrol, 18 parts of methyl piperidine-4-carboxylate, and 8 parts of acetic acid in 155 parts of toluene is refluxed for 1 hour in an apparatus equipped with a water trap. The reaction mixture is then filtered and the solvent is evaporated under reduced pressure. The residue is dissolved in ether and hexane is added whereupon a solid precipitates. This solid is crystallized twice from hexane to give methyl 1-(9-xanthenyl)piperidine-4-carboxylate melting at about 91–92° C.

Example 7

A solution is prepared from 10 parts of xanthydrol, 12 parts of ethyl piperidine-4-carboxylate and 140 parts of toluene. 10 parts of glacial acetic acid is added to the solution which is then refluxed for 16 hours in an apparatus equipped with a water trap. The solvent is then evaporated from the reaction mixture under reduced pressure and the residue is dissolved in ether. The ether solution is washed with water and dried and the solvent is evaporated to leave a residual crude solid. The solid is recrystallized twice from ethanol to give ethyl 1-(9-xanthenyl)piperidine-4-carboxylate melting at about 86–87° C.

If an equivalent quantity of 2-chloroxanthydrol is substituted for the xanthydrol and the procedure of Example 2 is repeated, the product obtained is ethyl 1-(2-chloro-9-xanthenyl)piperidine-4-carboxylate.

Likewise, if an equivalent quantity of ethyl piperidine-3-carboxylate is substituted for the ethyl piperidine-4-carboxylate and the procedure described in the first paragraph is repeated, the product obtained is ethyl 1-(9-xanthenyl)piperidine-3-carboxylate.

Example 8

15 parts of thioxanthydrol and 10 parts of methyl piperidine-4-carboxylate are dissolved in 155 parts of toluene and 5 parts of glacial acetic acid is added. The resultant mixture is refluxed for 4 hours in an apparatus equipped with a water trap. The solvent is evaporated from the resultant reaction mixture and the residue is dissolved in ether. The ether solution is filtered, concentrated, and cooled to give a crystalline product. This is recrystallized from hexane to give methyl 1-(9-thioxanthenyl)piperidine-4-carboxylate melting at about 133–134° C.

If ethyl piperidine-4-carboxylate is reacted with thioxanthydrol according to the procedure described in the preceding paragraph, the product obtained is ethyl 1-(9-thioxanthenyl)piperidine-4-carboxylate.

Example 9

A mixture of 15 parts of xanthydrol, 17 parts of ethyl 4-phenylpiperidine-4-carboxylate, and 8 parts of glacial acetic acid in 220 parts of toluene is heated at reflux for 16 hours in an apparatus equipped with a water trap. The resultant mixture is treated with charcoal and filtered while hot. The solvent is evaporated from the filtrate under reduced pressure to leave a residual solid which is mixed with ether and filtered. The solid is then recrystallized from a mixture of chloroform and ether to give ethyl 1-(9-xanthenyl)-4-phenylpiperidine-4-carboxylate melting at about 186–187° C.

An equivalent quantity of methyl 4-phenylpiperidine-4-carboxylate is substituted for the ethyl 4-phenylpiperidine-4-carboxylate and the above procedure is repeated to give methyl 1-(9-xanthenyl)-4-phenylpiperidine-4-carboxylate.

Example 10

A mixture of 12 parts of 2-chloroxanthydrol, 10 parts of ethyl 4-phenylpiperidine-4-carxoylate and 6 parts of glacial acetic acid in 220 parts of toluene is refluxed for 17 hours in an apparatus equipped with a water trap. The resultant mixture is treated with charcoal and filtered while hot and the solvent is evaporated from the filtrate at reduced pressure to leave a residual solid. This solid is recrystallized from a mixture of chloroform and ether to give ethyl 1-(2-chloro-9-xanthenyl)-4-phenylpiperidine-4-carboxylate melting at about 199–200° C.

If an equivalent quantity of 4-methylxanthydrol is substituted for the 2-chloroxanthydrol and the above procedure is repeated, the product obtained is ethyl 1-(4-methyl-9-xanthenyl)-4-phenylpiperidine-4-carboxylate.

Example 11

A mixture of 12 parts of thioxanthydrol, 10 parts of ethyl 4-phenylpiperidine-4-carboxylate, and 6 parts of glacial acetic acid in 220 parts of toluene is refluxed for 19 hours in an apparatus equipped with a water separator. The resultant reaction mixture is treated with charcoal and filtered while still hot. The solvent is evaporated from the filtrate under reduced pressure to leave a residual solid. This solid is dissolved in chloroform and hexane is added. The resultant mixture is cooled to give crystals which are separated and recrystallized from a mixture of chloroform and pentane to give ethyl 1-(9-thioxanthenyl)-4-phenylpiperidine 4-carboxylate -melting at about 146–148° C.

If an equivalent quantity of methyl 4-phenylpiperidine-4-carboxylate is substituted for the 10 parts of ethyl 4-phenylpiperidine-4-carboxylate and the above procedure is repeated, there is obtained methyl 1-(9-thioxanthenyl)-4-phenylpiperidine-4-carboxylate.

Example 12

10 parts of xanthydrol is dissolved in 105 parts of toluene and 4 parts of glacial acetic acid is added. The solution is then heated and 5 parts of 1-methylpiperazine is added. The mixture is then refluxed for 18 hours in an apparatus equipped with a water trap. The solvent is evaporated under reduced pressure to leave a residual oil which subsequently solidifies. This solid is recrystallized from hexane to give 1-methyl-4-(9-xanthenyl)piperazine melting at about 116–117° C.

Example 13

A mixture of 14 parts of xanthydrol, 7 parts of 1-methylpiperazine, and 5 parts of glacial acetic acid in 130 parts of toluene is refluxed for 7 hours. The solvent is evaporated from the reaction mixture under reduced pressure and the resultant residue is crystallized from hexane to give 1-methyl-4-(9-xanthenyl)piperazine melting at about 116–117° C.

Example 14

8 parts of xanthydrol, 4 parts of 1-methylpiperazine, and 5 parts of benzoic acid are dissolved in 175 parts of toluene and the resultant solution is refluxed for 17 hours in an apparatus equipped with a water trap. The solvent is evaporated from the resultant solution to leave a residual oil which is dissolved in ether and washed with dilute sodium hydroxide solution. The ether solution is dried and treated with charcoal and then concentrated, under reduced pressure, to a small volume. Hexane is added and the resultant solution is cooled in ice. The solid which forms is separated. It is 1-methyl-4-(9-xanthenyl)piperazine melting at about 116–117° C.

Example 15

A solution of 20 parts of xanthydrol, 10 parts of 2-piperazinone, and 6 parts of glacial acetic acid in 150 parts of toluene is refluxed for 16 hours. The resultant solution is treated with charcoal and filtered while hot. Crystals form when the solution is allowed to cool. This solid is separated and crystallized from a mixture of chloroform and ether to give 4-(9-xanthenyl)-2-piperazinone melting at about 228–229° C. This compound has the following formula

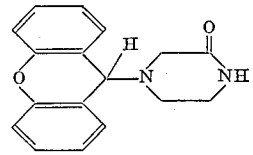

Example 16

An equivalent quantity of piperidine-4-carboxamide is substituted for the 2-piperazinone and the procedure described in Example 15 is repeated. In this case the crude product is recrystallized from a mixture of chloroform and ether to give 1-(9-yanthenyl)piperidine-4-carboxamide melting at about 193–195° C.

An equivalent quantity of N-(2-diethylaminoethyl) piperidine-4-carboxamide is substituted for the 2-piperazinone and the procedure described in Example 15 is repeated. The crude product obtained in this way is recrystallized from a mixture of benzene and hexane to give N-(2-diethylaminoethyl)-1-(9-xanthenyl)piperidine-4-carboxamide melting at about 173–174° C. This compound has the following formula

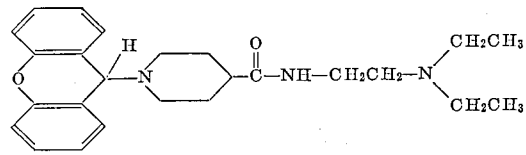

Example 17

An equivalent quantity of 1-phenylpiperazine is substituted for the 2-piperazinone and the procedure described in Example 15 is repeated. The crude product obtained is recrystallized from a mixture of chloroform and ether to give 1-phenyl-4-(9-xanthenyl)piperazine melting at about 194–195° C.

If an equivalent of 1-benzylpiperazine is substituted for the 2-piperazinone and the procedure of Example 15 is repeated, the product obtained is 1-benzyl-4-(9-xanthenyl) piperazine melting at about 117–118° C. This compound has the following formula

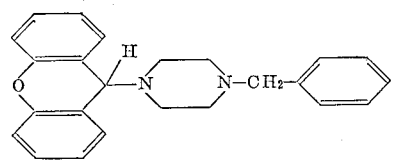

Example 18

1-methylpiperazine is reacted with 2-chloroxanthydrol according to the procedure described in Example 15. The crude product obtained is crystallized from a mixture of chloroform and hexane to give 1-methyl-4-(2-chloro-9-xanthenyl)piperazine melting at about 140–141° C.

Example 19

3 parts of xanthydrol is added to 5 parts of ethanol; this is followed by the addition of 4.5 parts of glacial acetic acid. The resultant mixture is warmed until a solution is obtained. Then, 2 parts of 1-nitrosopiperazine is added and the solution is allowed to stand at room temperature for 30 minutes. A heavy solid forms. This is separated by filtration and recrystallized from a mixture of chloroform and hexane to give 1-nitroso-4-(9-xanthenyl)piperazine melting at about 184–185° C.

What is claimed is:

1. A process for the preparation of a compound of the formula

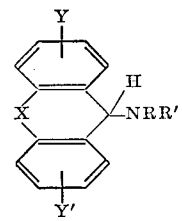

wherein X is selected from the group consisting of O and S; Y and Y' are selected from the group consisting of hydrogen, lower alkyl, halogen, and lower alkoxy; and R and R' are selected in such a way that HNRR' is a secondary amine, which comprises bringing a secondary amine into contact with a compound of the formula

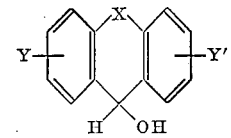

wherein X, Y, and Y' are defined as above, in an inert organic solvent in the presence of an organic carboxylic acid selected from lower alkanoic, benzoic, and substituted benzoic acids.

2. A process for the preparation of 1-nitroso-4-(9-xanthenyl)piperazine which comprises contacting 1-nitrosopiperazine with xanthydrol in an inert organic solvent in the presence of an organic carboxylic acid selected from lower alkanoic, benzoic, and substituted benzoic acids.

3. A process for the preparation of 1-nitroso-4-(9-xanthenyl)piperazine which comprises contacting 1-nitrosopiperazine with xanthydrol in an inert organic solvent in the presence of acetic acid.

4. A process for the preparation of a 1-carbo(lower alkoxy)-4-(9-xanthenyl)piperazine which comprises contacting a 1-carbo(lower alkoxy)piperazine with xanthydroy in an inert oganic solvent in the presence of an organic carboxylic acid selected from lower alkanoic, benzoic, and substituted benzoic acids.

5. A process for the preparation of 1-carbethoxy-4-(9-xanthenyl)piperazine which comprises contacting 1-carbethoxypiperazine with xanthydrol in an inert organic solvent in the presence of acetic acid.

6. A process for the preparation of a lower alkyl 1-(9-xanthenyl)piperazine-4-carboxylate which comprises contacting a lower alkyl piperidine-4-carboxylate with xanthydrol in an inert organic solvent in the presence of an organic carboxylic acid selected from lower alkanoic, benzoic, and substituted benzoic acids.

7. A process for the preparation of ethyl 1-(9-xanthenyl)piperazine-4-carboxylate which comprises contacting ethyl piperidine-4-carboxylate with xanthydrol in an inert organic solvent in the presence of acetic acid.

8. A process for the preparation of a lower alkyl 4-phenyl-1-(9-xanthenyl)piperidine-4-carboxylate which comprises contacting a lower alkyl 4-phenylpiperidine-4-carboxylate with xanthydrol in an inert organic solvent in the presence of an organic carboxylic acid selected from lower alkanoic, benzoic, and substituted benzoic acids.

9. A process for the preparation of ethyl 4-phenyl-1-(9-xanthenyl)piperidine-4-carboxylate which comprises contacting ethyl 4-phenylpiperidine-4-carboxylate with xanthydrol in an inert organic solvent in the presence of acetic acid.

10. 1-methyl-4-(9-xanthenyl)piperazine.
11. 1-methyl-4-(2-chloro-9-xanthenyl)piperazine.
12. 4-(9-xanthenyl)-2-piperazinone.

References Cited by the Examiner

UNITED STATES PATENTS

| | | | |
|---|---|---|---|
| 3,157,658 | 11/1964 | Cusic et al. | 260—268 |
| 3,159,636 | 12/1964 | Yonan et al. | 260—268 |

HENRY R. JILES, *Acting Primary Examiner.*

JAMES W. ADAMS, *Assistant Examiner.*